United States Patent [19]

Aoyama et al.

[11] Patent Number: 5,245,851
[45] Date of Patent: Sep. 21, 1993

[54] DIFFERENTIAL PINION, METAL MOLD FOR PLASTIC WORKING THE SAME, AND METHOD FOR PLASTIC WORKING WITH THE METAL MOLD

[75] Inventors: Susumu Aoyama, Misato; Nobuyuki Ishinaga; Kazuto Kobayashi, both of Sagamihara, all of Japan

[73] Assignees: M.H. Center Limited, Tokyo; Aida Engineering, Ltd., Kanagawa, both of Japan

[21] Appl. No.: 958,535

[22] Filed: Oct. 8, 1992

Related U.S. Application Data

[63] Continuation of Ser. No. 873,337, Apr. 20, 1992, abandoned, which is a continuation of Ser. No. 583,580, Sep. 17, 1990, abandoned.

[30] Foreign Application Priority Data

Sep. 19, 1989 [JP] Japan .................. 1-242517

[51] Int. Cl.$^5$ .................. B21K 1/00
[52] U.S. Cl. .................. 72/358; 475/344; 74/459.5
[58] Field of Search .................. 74/459.5; 475/344, 345; 72/359; 29/893.34

[56] References Cited

U.S. PATENT DOCUMENTS

| | | | |
|---|---|---|---|
| 2,713,277 | 7/1955 | Kaul | 74/459.5 X |
| 3,780,413 | 12/1973 | Burgdorf | 74/459.5 X |
| 4,008,599 | 2/1977 | Dohmann | 29/893.34 X |
| 4,299,112 | 11/1981 | Kondo et al. | 29/893.34 X |
| 4,942,781 | 7/1990 | Hori | 475/344 X |

FOREIGN PATENT DOCUMENTS

| | | |
|---|---|---|
| 0275561 | 7/1988 | European Pat. Off. . |
| 1148184 | 12/1957 | France . |
| 7046308 | 3/1972 | France . |
| 0020228A1 | 12/1980 | France . |
| 54-33583 | 10/1979 | Japan . |
| 55-141348 | 11/1980 | Japan . |
| 2056894 | 3/1981 | United Kingdom . |

OTHER PUBLICATIONS

European Search Report; Patent No. 90117967.1.

Primary Examiner—Allan D. Herrmann
Assistant Examiner—William O. Trousdell
Attorney, Agent, or Firm—Kalish & Gilster

[57] ABSTRACT

The present invention relates to a differential pinion for automobiles or the like, a metal mold for plastic working the differential pinion, and a method for plastic working with the above metal mold. And particularly the differential pinion of the present invention is provided with an end relief section which is effective to reduce a noise and has a continuous fiber flow from a tooth face to the end relief section providing a high pitting resistance. The metal mold for plastic working the differential pinion of the present invention can provide the internal pressure working area of the die in a position deep below the open end by a required distance therefrom, thereby providing the metal mold with higher rigidity and strength. Further, in the plastic working method of the present invention, it is very easy to position the punch under pressure stress in the axial direction.

2 Claims, 9 Drawing Sheets

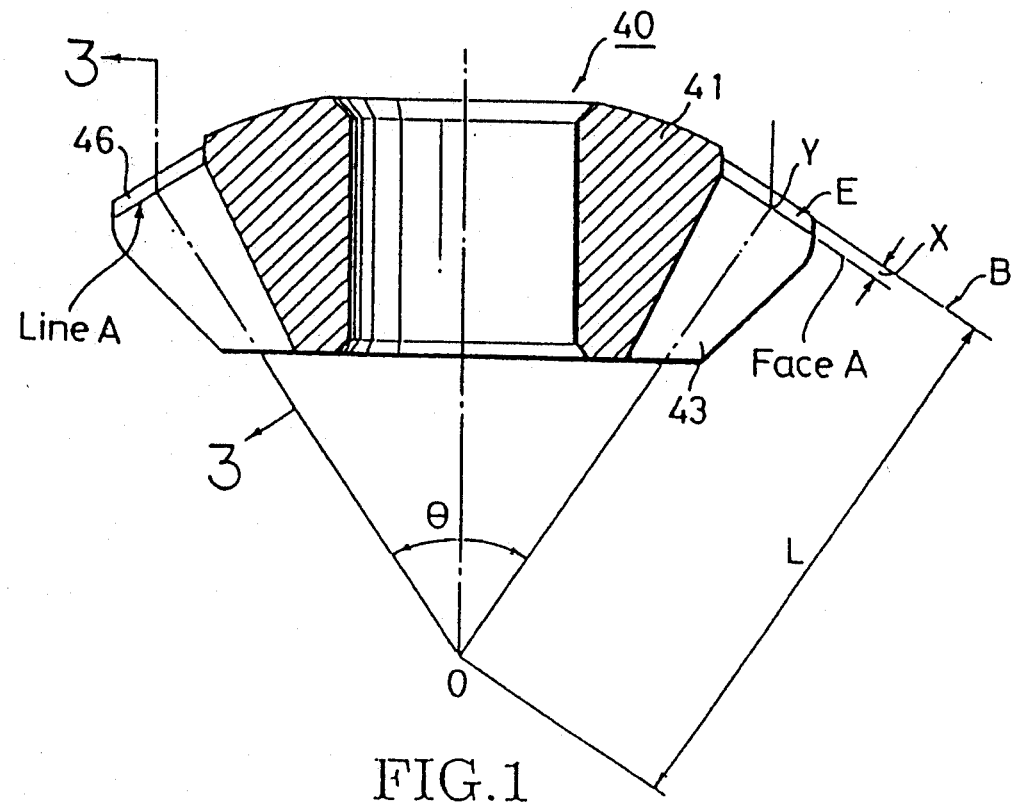
FIG.1
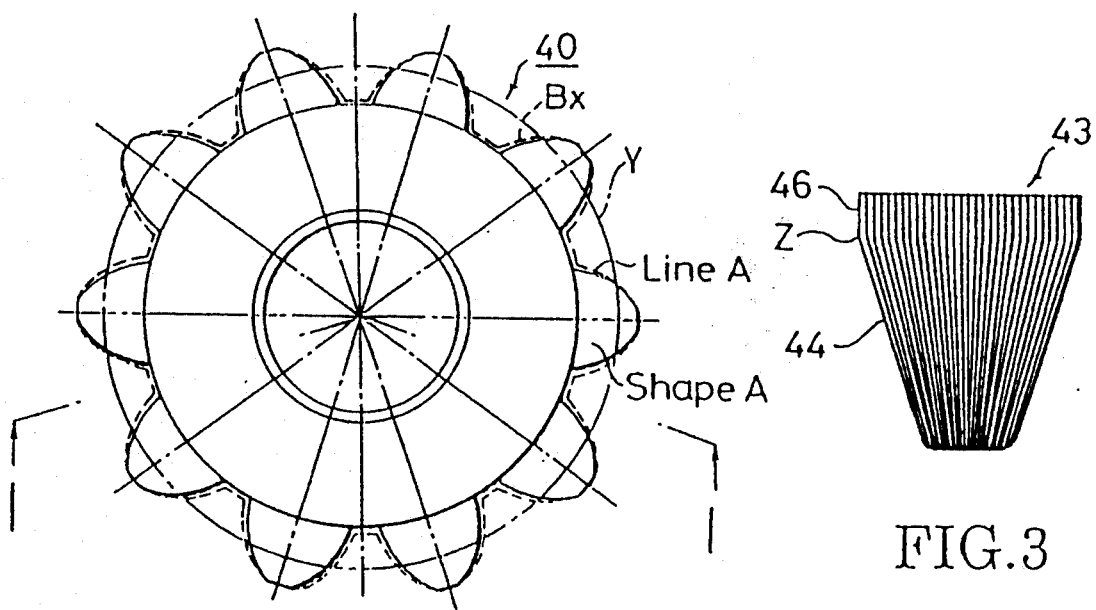
FIG.2
FIG.3

DIFFERENTIAL PINION, METAL MOLD FOR PLASTIC WORKING THE SAME, AND METHOD FOR PLASTIC WORKING WITH THE METAL MOLD

This application is a continuation of application Ser. No. 07/873,337, filed Apr. 20, 1982, now abandoned, which is a continuation of application Ser. No. 07/583,580, filed Sep. 17, 1990, now abandoned.

BACKGROUND OF THE INVENTION

1. Field of the Invention

The present invention relates to a differential pinion, a metal mold for plastic working the differential pinion, and a method for plastic working with the above metal mold, and particularly to a differential pinion having an end relief section, a metal mold for plastic working the above differential pinion, and a method for plastic working with the above metal mold.

2. Description of the Prior Art

FIG. 12 to FIG. 15 show a conventional differential pinion 10 which is used in differential gears for automobiles and others. This differential pinion 10 is formed by having a tooth section 13 formed on the outer periphery of a gear body 11. And in FIG. 12, a pitch angle is indicated by $\theta$ and a distance from a cone vertex O to a cone distance large end face B by L. FIG. 13 shows a sectional view taken on line 13—13 of the tooth section 13 in FIG. 12.

Heretofore, the above differential pinion 10 has its tooth face 14 formed by cutting work (see FIG. 12) or plastic working (see FIG. 14).

Lately, an end relief section may be provided on the cone distance large end face of the tooth face which is formed by cutting or plastic working, to remove the contact of the above large end face and to reduce a noise. FIG. 16 and FIG. 17 show differential pinions which are provided with end relief sections E.

Heretofore, the end relief sections E have been formed by cutting work.

As shown in FIG. 14, the production of the differential pinion 10 by plastic working uses closed forging which does not produce an excess wall which protrudes out of the cone distance large end face B, which is required to be removed by processing at the completion of forming the pinion.

FIG. 20 shows a closed forging metal mold to be used for closed forging. In this metal mold, the lower part of a cope 15 and the upper part of a drag 17 are provided with a shaped section 19 for plastic working a differential pinion 16. The cope 15 has a punch 21 inserted therein, and the drag 17 a counter punch 23 therein.

In the above closed forging metal mold, the cope 15 and the drag 17 are preliminarily pressed, and with the cope 15 and the drag 17 securely held, the punch 21 and the counter punch 23 are inserted, thereby capable of producing the differential pinion 16 not having an excess wall protruding out of the cone distance large end face B which is required to be removed by later treatment.

But, in the conventional differential pinion 10 shown in FIG. 12 and FIG. 14, the tooth section 13 has a working face covering the cone distance large end face B against a mating gear, inducing a drawback of producing noise readily.

In the differential pinion 10 which is provided with an end relief face 18 shown in FIG. 16, when the tooth face 14 is formed by cutting work and then the end relief face 18 is formed by cutting work, fiber flow is disrupted at the tooth face 14 as shown in FIG. 18. Particularly, there is a drawback that separation and other defects readily occur at boundary point Z between the end relief face 18 and the tooth face 14. But, when the end relief face 18 is formed by cutting work after producing the tooth face 14 by plastic working, fiber flow is also disrupted as shown in FIG. 19, causing a drawback such as separation at about the boundary point Z.

The closed forging metal mold shown in FIG. 20 has a mold separation surface at the cone distance large end face B, which is positioned higher than the horizontal separation surface (surface D in the figure), and therefore the metal mold has poor strength and rigidity, resulting in a partial elastic deformation thereof. As shown in FIG. 21, it is substantially impossible to prevent the production of burrs in a space 19 between the cope 15 and the drag 17 and remedy an insufficient Wall thickness within the space 19. As a result, the differential pinion produced has drawbacks that it has a tight tooth contact around the cone distance large end face B and readily makes noise.

Summary of the Invention

The present invention was completed to remedy the existing drawbacks mentioned above. The present invention aims to provide a differential pinion which reduces noises and does not cause many drawbacks such as pitting or the like on the tooth face, a metal mold for plastic working the above differential pinion, and a method for plastic working with the above metal mold.

The present invention has a characteristic that the end relief section is provided on the cone distance large end face side, and also both the tooth face and the end relief face have a continuous fiber flow, so that a noise can be reduced and a drawback such as pitting or the like can be suppressed, too.

The present invention has another characteristic that as a design of the differential pinion for mass-production, the end relief face is structured by part of a face parallel to a gear axis of rotation including line A, so that the differential pinion having continuous fiber flow of the tooth face and the end relief face can be readily obtained by plastic working.

The present invention has a further characteristic that in a die there is a space on the side of the cone vertex with face A as a boundary in which a certain tooth profile is formed; on the side of a punch with face A as a boundary, there is provided a space which is structured by faces parallel to the gear axis of rotation including line A and continued to the open end on the punch side, and a shape which corresponds to the cone distance large end face formed on the punch facing and to be engaged with the die on the face parallel to the gear axis of rotation including line A, so that the inner pressure application area of the die can be set at a position deep enough by a required distance from the open end, thus the metal mold with high rigidity and strength can be attained.

The present invention is also, briefly, a metal mold for plastic working a differential pinion having a plurality of teeth. Each tooth includes an uncut, unground end relief face intersecting with a cone distance large end face and a tooth face, the tooth face and the end relief face each having continuous fiber flow. The fibers are longitudinally aligned in such manner that they are parallel to the tooth face and the end relief face substantially at all points therealong, to thereby improve tooth contact and reduce noise and pitting of the teeth without requiring grinding or cutting the pinion after forming thereof. The metal mold has a punch fitted with a die and the punch has its portion facing the die formed with a shape corresponding to said cone distance large end face and the die has a first space and a second space. The first space is on the side of a cone vertex with a face as a boundary for producing a certain tooth shape and the second space is bounded by a die surface parallel to an axis of rotation of the differential pinion. The die surface forms the end relief face, and the second space continues to an open end of the die facing the punch, and the punch is fitted in the second space and is guided by the die surface.

The present invention has an additional characteristic that the punch's portion facing the die is inserted to a desired cone distance large end face position in the die, and the tooth face, the end relief face and the cone distance large end face are molded simultaneously, so that the punch under pressure stress can be very easily positioned in the axial direction. Thus, the differential pinion with continuous fiber flow of the tooth face and the end relief can be produced easily and surely.

BRIEF DESCRIPTION OF THE DRAWINGS

FIG. 1 is a longitudinal sectional view of one embodiment of the differential pinion of the present invention taken on line 1—1 of FIG. 2.

FIG. 2 is a top view of the differential pinion of FIG. 1.

FIG. 3 is a longitudinal sectional view of a fiber flow taken on line 3—3 of FIG. 1.

DESCRIPTION OF THE PREFERRED EMBODIMENT OF THE INVENTION

The present invention will be described in detail with reference to the attached drawings.

FIG. 1 to FIG. 7 illustrate one embodiment of the differential pinion of the present invention. In the figures, a differential pinion 40 has a tooth section 43 formed on the outer periphery of a gear body 41.

A pitch angle is determined to be $\theta$ and a distance from a cone vertex O to a cone distance large end face B be L. In FIG. 2, Y indicates a line where a pitch angle $\theta$ and face A intersect.

Figure 4:
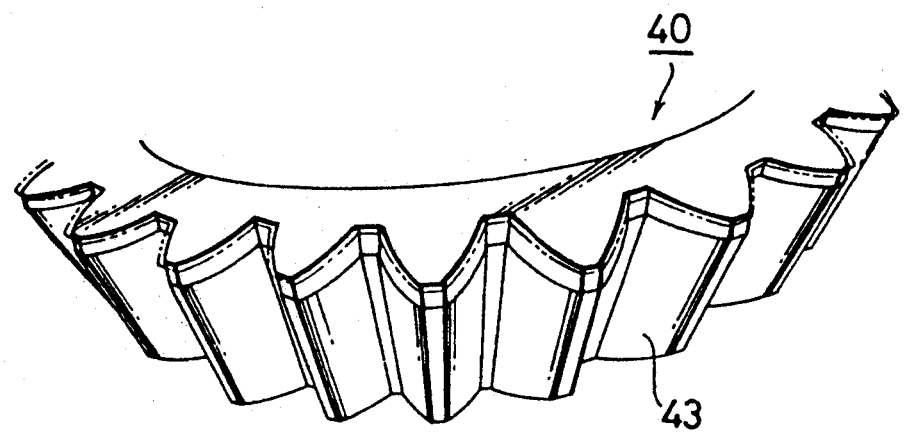
FIG. 4 is a perspective view of the principal part of Fig. I.
Figure 5:
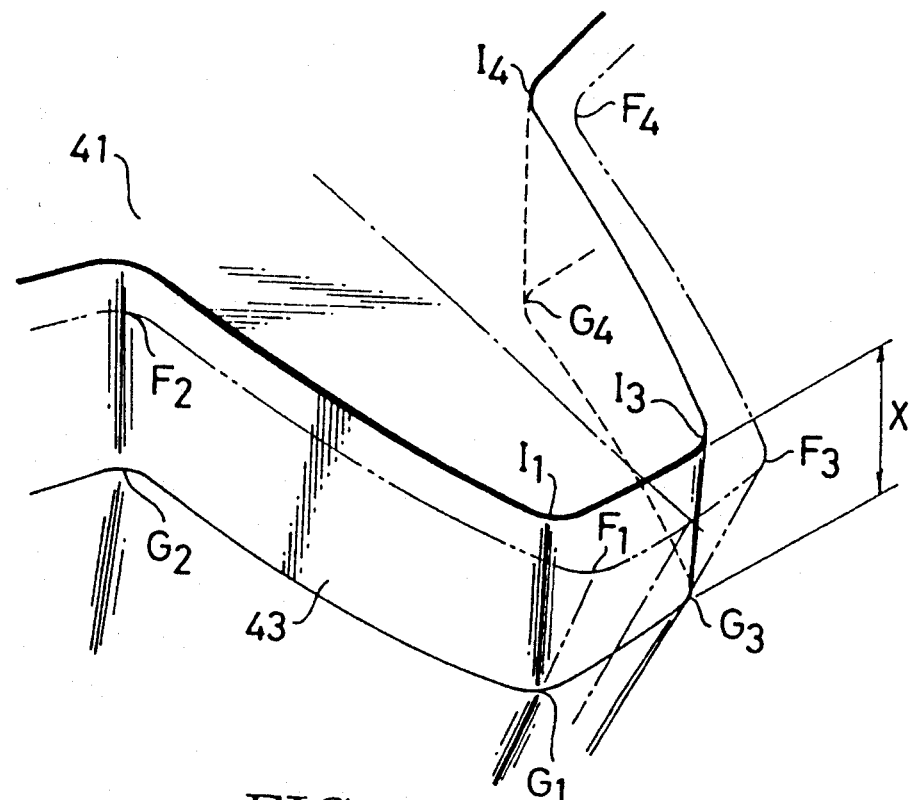
FIG. 5 is an enlarged perspective view of the principal part of FIG. 4.
Figure 7:
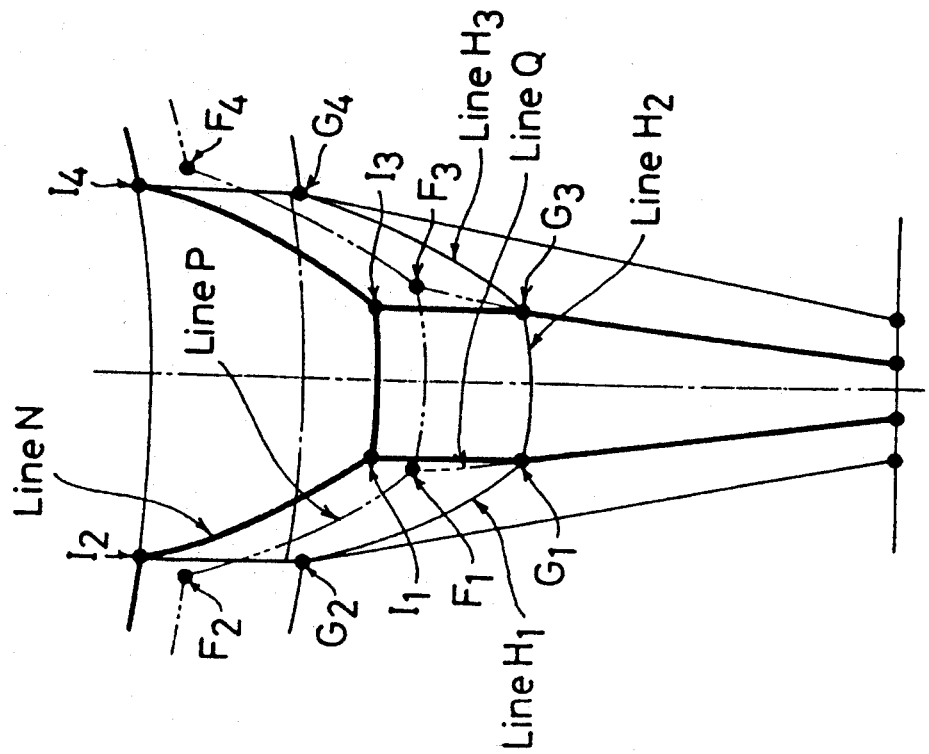
FIG. 7 is an enlarged front view of the principal part of FIG. 4.
Figure 6:
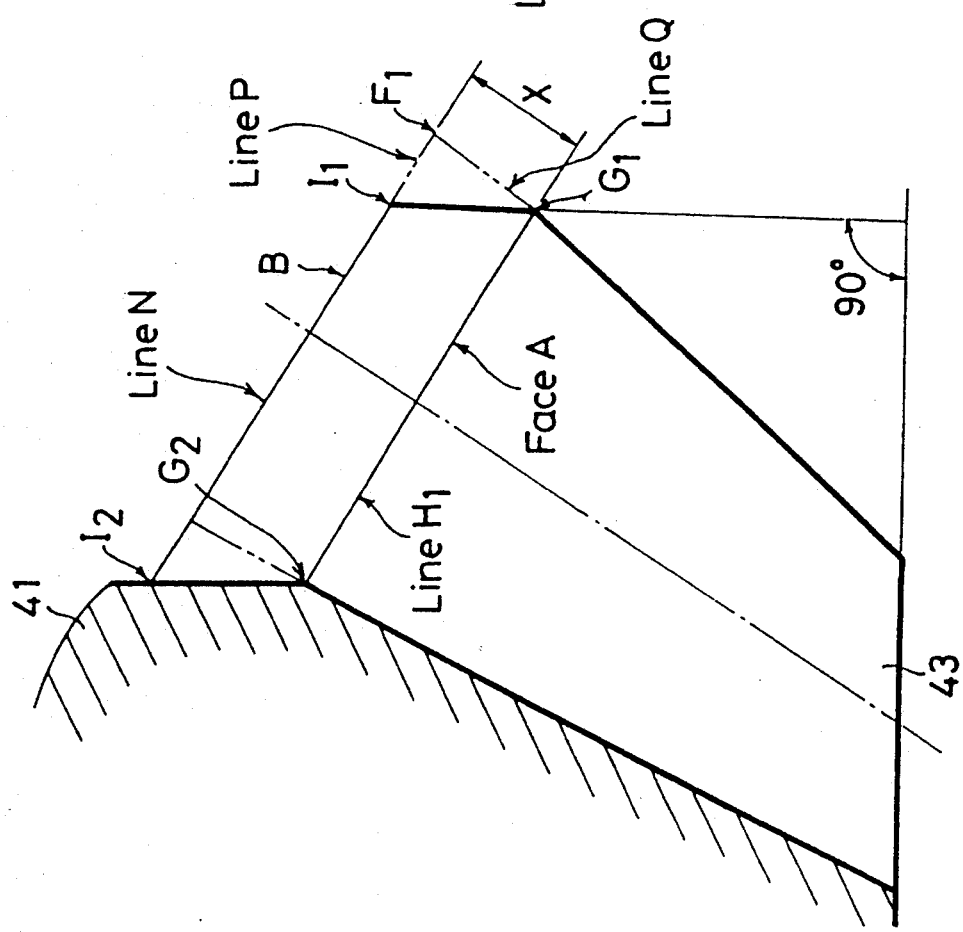
FIG. 6 is an enlarged sectional view of the principal part of FIG. 4.

In this embodiment, a surface, or the face A, which is almost parallel to the cone distance large end face B is formed in position close to the cone vertex O by a certain distance X, e.g. about 1 mm, from the cone distance large end face B of the tooth section 43 formed on the gear body 41. This face A, as shown in FIG. 5 to FIG. 7, consists of lines $H_1$ to $H_3$ which intersect a normal tooth profile on the face brought close to the differential pinion center (cone vertex O) in parallel to the cone distance large end face B. The figures illustrate $G_1$ to $G_4$ where the line $H_1$ to $H_3$ intersect the normal tooth profile.

Distance X is suitably determined depending on the shape, size and application of the differential pinion but shall agree with the size of the end relief section E.

A border line formed on a tooth face 44 by the face A and the tooth shape of tooth section 43 is determined to be line A. An end relief face 46 is structured by part of the face parallel to the gear axis of rotation including the line A between the face A and the cone distance large end face B. The outline of the cone distance large end face B of the formal tooth shape is determined to be line P whose intersections with the tooth line are indicated by $F_1$ to $F_4$. In FIG. 6 and FIG. 7, a line which is assumed to be moved up away from and in parallel with lines $H_l$ to $H_3$ and with tooth axis and intersected with the cone distance large end face B is determined to be line N, and its intersections are $I_1$ to $I_4$. The shape line indicated by lines $H_l$ to $H_3$ has an identical shape with that shown by line N. That is, the line N exists within the line P which shows the formal tooth shape.

Thus, as for the shape of the end relief section E which is generally not particularly specified, it can be proved that the face parallel to the gear axis of rotation including line A set by the inventor fully satisfies the function as the end relief section. More specifically, in combination with the metal mold structure and plastic molding method to be described afterward, the fiber flow of the material inherently existing parallel to the axis, as shown in FIG. 3, runs on the surface and interior from the tooth face 44 to the end relief face 46 via branch point Z for the differential pinion of the present invention. Therefore, the differential pinion of this embodiment reduces noise and has less defects such as pitting.

Figure 8:
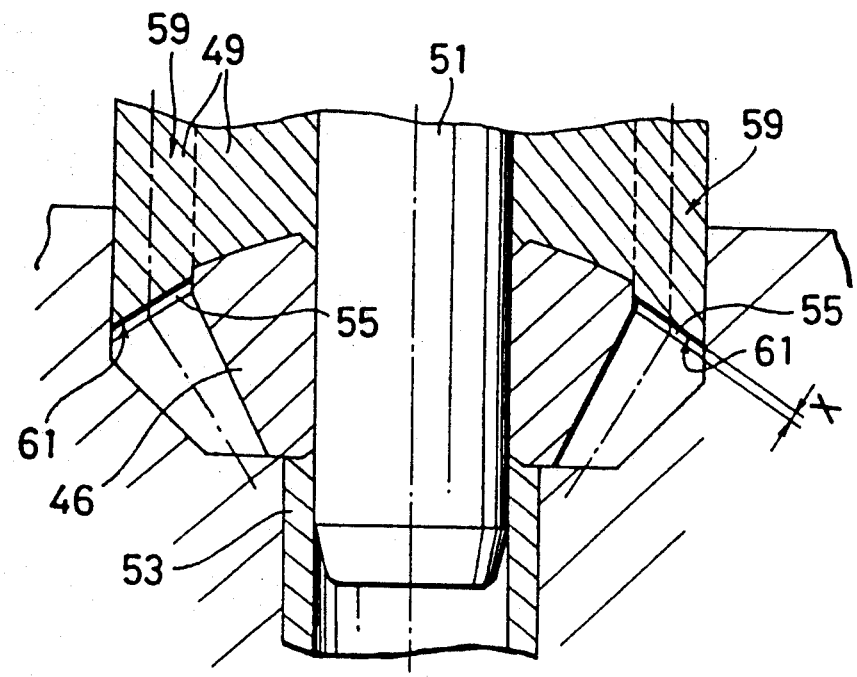
FIG. 8 is a longitudinal sectional view of one embodiment of the plastic working metal mold for the differential pinion of the present invention.
Figure 9:
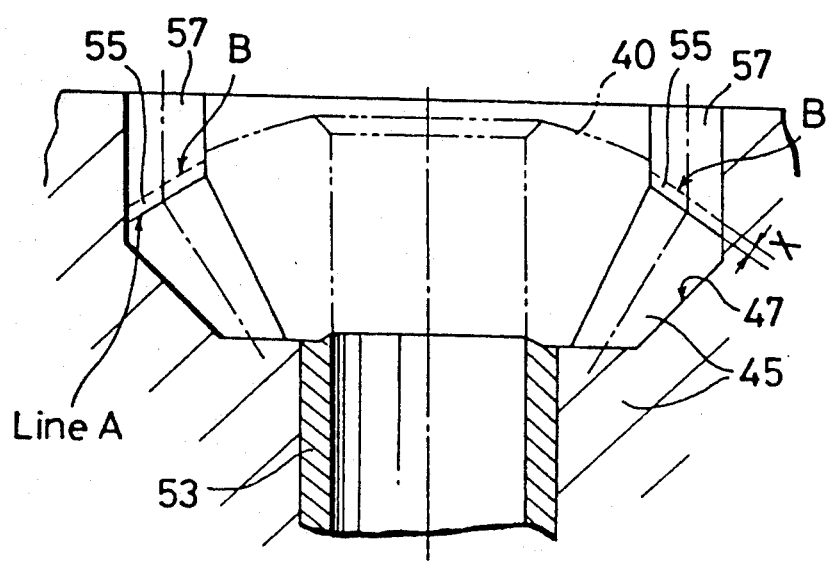
FIG. 9 is a longitudinal sectional view of a die of the plastic working metal mold for the differential pinion of FIG. 8.

FIG. 8 and FIG. 9 show one embodiment of the plastic working metal mold for forming the above differential pinion. In this mold, as shown in FIG. 9, a space 47 is provided for plastic working the differential pinion 40 at the upper part of the die 45, and a punch 49 and a mandrel 51 are inserted in the upper part of the die 45, and a counter punch 53 is inserted in the lower part of the die 45.

The die 45 is provided with a space 57 opened toward the punch 49 side and continued from a space 55 corresponding to the shape of the end relief section E, (FIG. 1) as a space for forming a part between the face A and the cone distance large end face B.

The punch 49 has a part 59 which is fitted with the space 57 and a face 61 having a shape corresponding to the cone distance large end face B to face the die 45.

Since the die 45 and the punch 49 are two-dimensionally fitted with each other, they have freedom in their relative position in the axial direction of the die 45 and the punch 49. Thus, precision at this part may be allowed not to be very high, and positioning of the punch 49 in the axial direction under pressure stress becomes very easy.

Further, the die 45 may have its internal pressure working area set at a position below the open end by a required distance, resulting in producing a metal mold with high rigidity and strength.

As described above, into the die 45 having the space 55 for forming the end relief section E (FIG. 1) and communicated to the space 57 for forming the tooth face, the punch 49 is inserted by two-dimensional fitting through the open end on the side of the punch 49, so that its face 61 corresponding to the cone distance large end face B on the side of the die 45 is inserted to a desired cone distance large end face position in the die 45. Thus the tooth face 44, (FIG. 3) the end relief face 46 and the cone distance large end face B are produced simultaneously. Thus, as shown in FIG. 1 and Fig. 3, the present invention provides a method to produce the differential pinion 40 which possesses the end relief section E and continuous fiber flow of the tooth face 44 and the end relief face 46 readily, securely and inexpensively.

Figure 10:
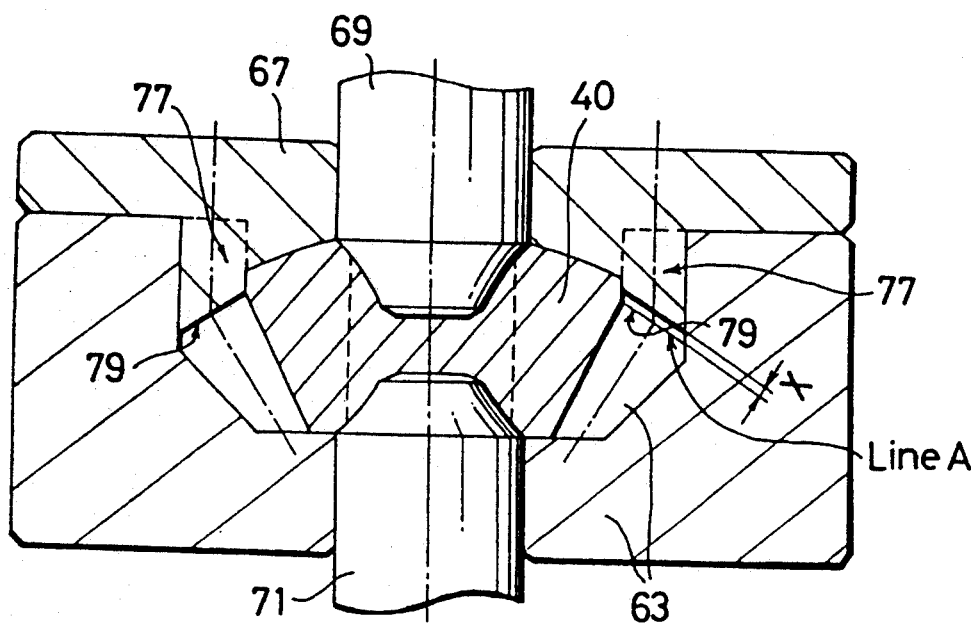
FIG. 10 is a longitudinal sectional view of another embodiment of the plastic working metal mold for the differential of the present invention.
Figure 11:
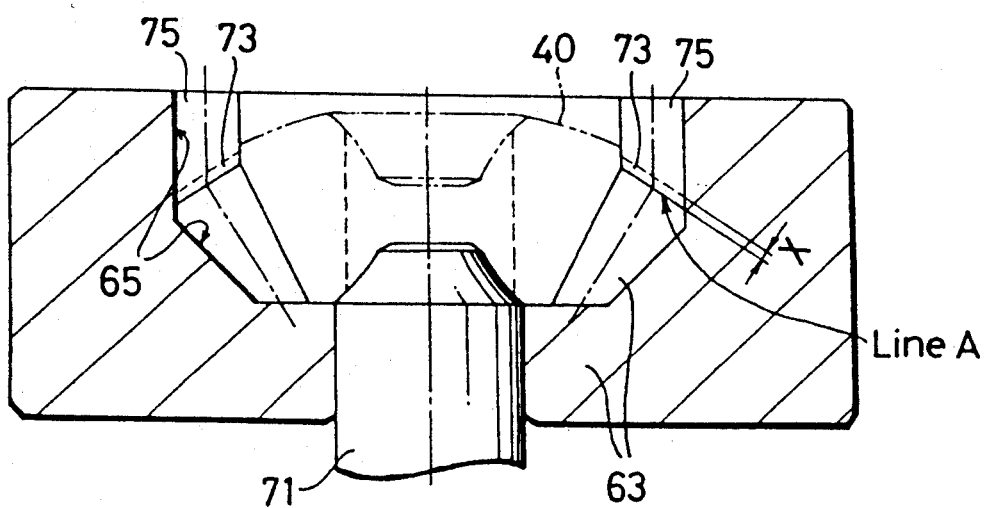
FIG. 11 is a longitudinal sectional view of a die of the plastic working metal mold for the differential pinion of FIG. 10.
Figure 12:
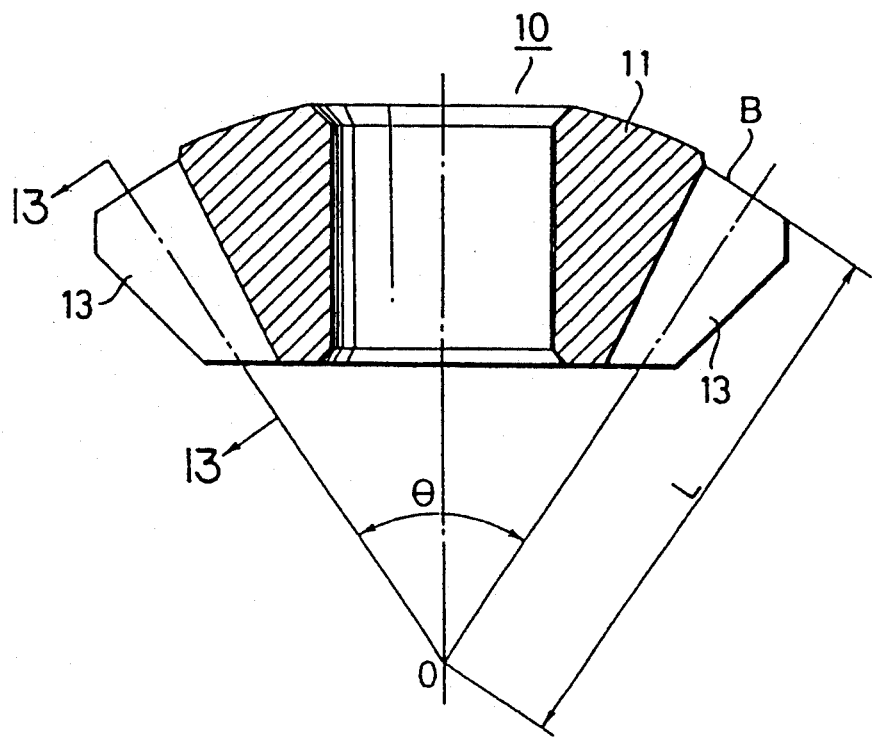
FIG. 12 is a longitudinal sectional view of one embodiment of conventional differential pinions produced by cutting the tooth face.
Figure 13:
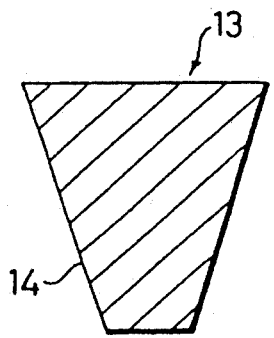
FIG. 13 is a longitudinal sectional view taken on line 13—13 of FIG. 12.
Figure 14:
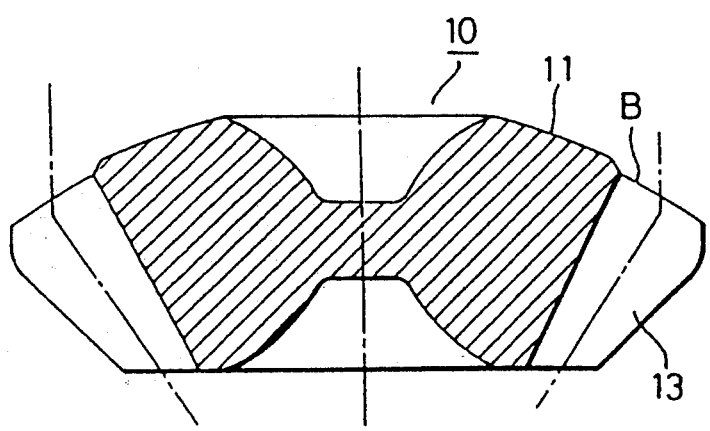
FIG. 14 is a longitudinal sectional view of one embodiment of conventional differential pinions produced by having the tooth face plastic-worked.
Figure 15:
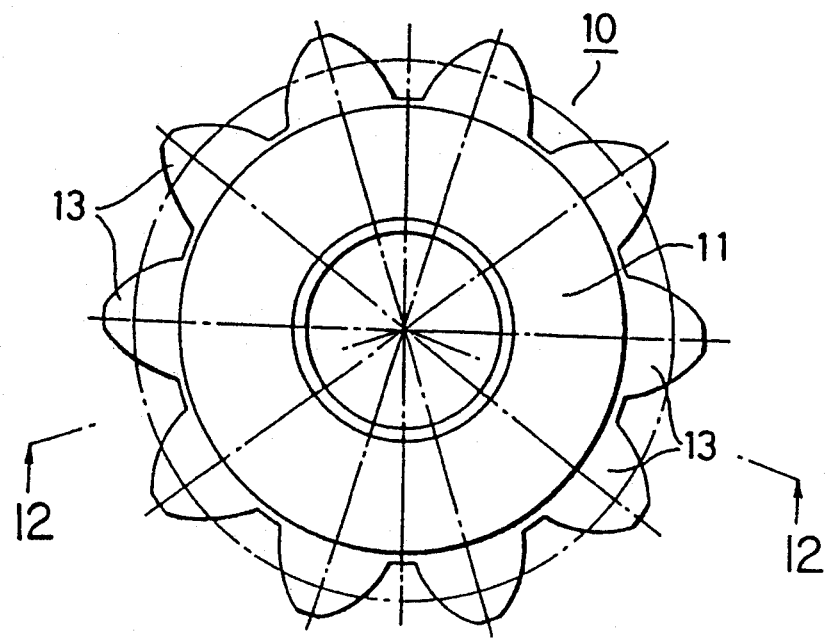
FIG. 15 is a top view of the differential pinion of FIG. 12 and FIG. 13.
Figure 16:
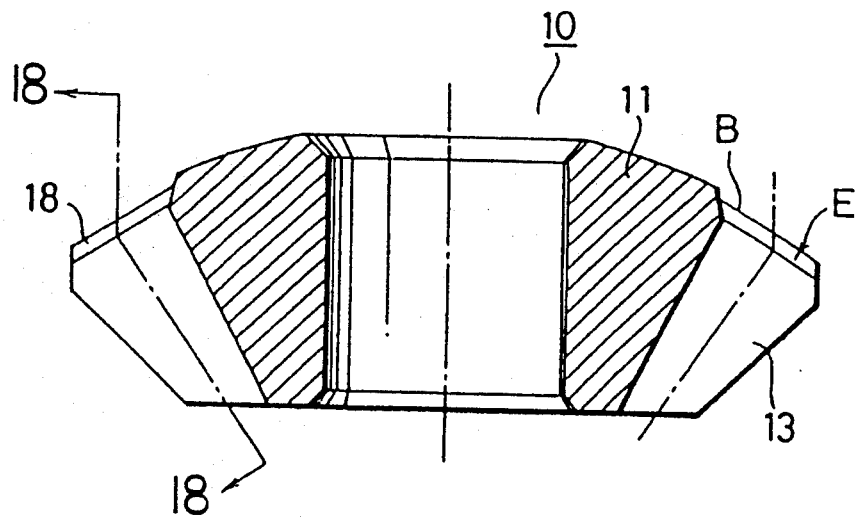
FIG. 16 is a longitudinal sectional view of one embodiment of conventional differential pinions produced by having the end relief section formed on the differential pinion which has the tooth face of FIG. 12 formed by cutting.
Figure 17:
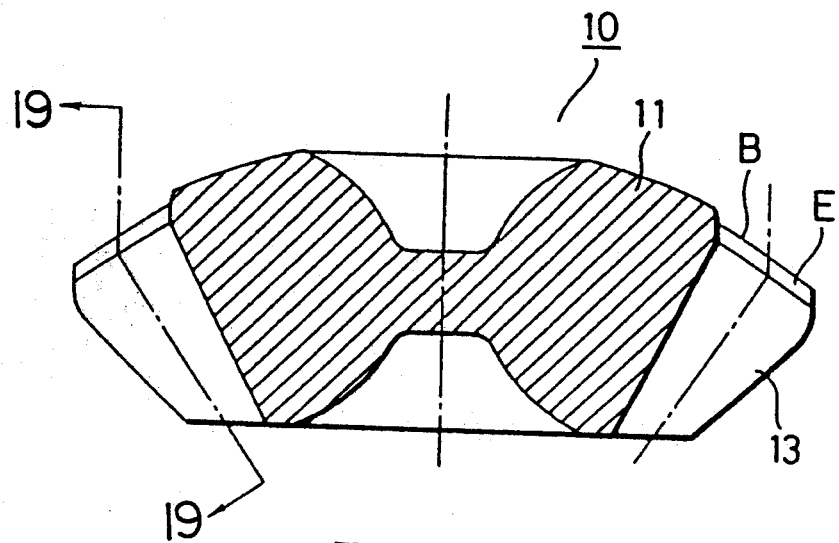
FIG. 17 is a longitudinal sectional view of one embodiment of conventional differential pinions produced by having the end relief section formed on the differential pinion which has the tooth face of FIG. 13 formed by plastic working.
Figure 18:
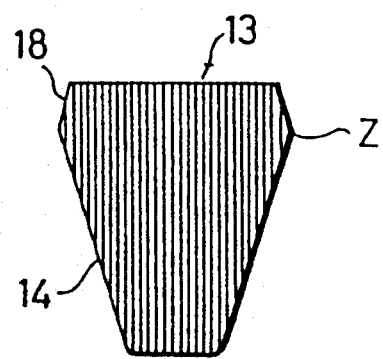
FIG. 18 is a longitudinal sectional view of fiber flow taken on line 18—18 of FIG. 16.
Figure 19:
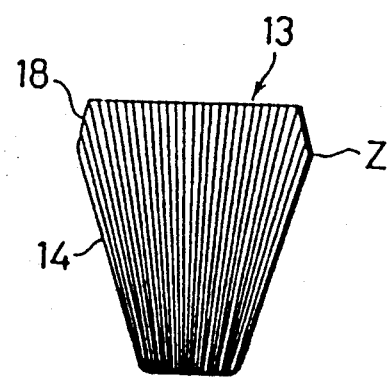
FIG. 19 is a longitudinal sectional view of fiber flow taken on line 19—19 of FIG. 17.
Figure 20:
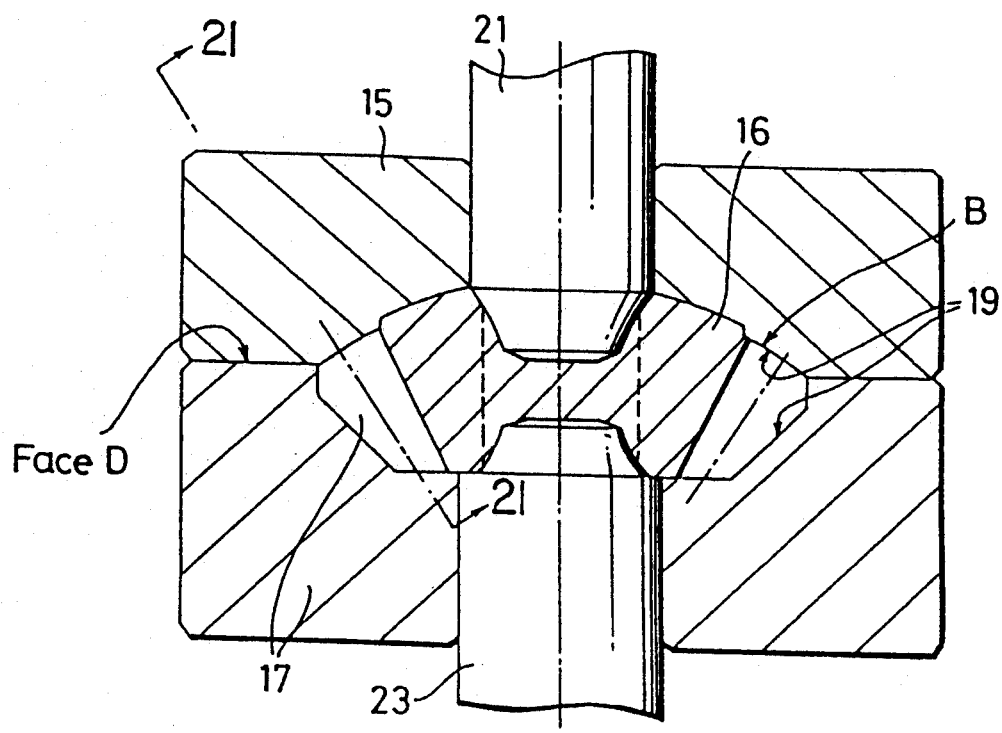
FIG. 20 is a longitudinal sectional view of a conventional plastic working metal mold for a conventional differential pinion.
Figure 21:
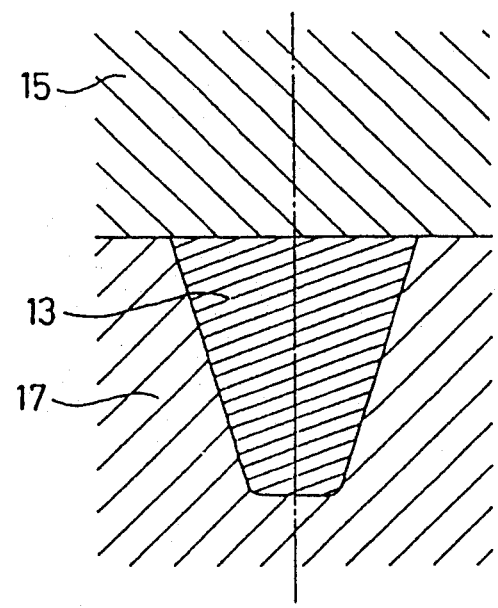
FIG. 21 is a longitudinal sectional view taken on line 21—21 of FIG. 20.

FIG. 10 shows another embodiment for producing the differential pinion of the present invention. The figure shows a closed forging metal mold to be used for closed forging. As shown in FIG. 11, a drag 63 is provided with a space 65 at its upper part for plastic working the differential pinion 40, a punch 69 inserted into a cope 67, and a counter punch 71 inserted into the drag 63.

In the drag 63, as a space to form a part between face A and cone distance large end face B, a space 73 is provided to correspond to an end relief section E, (FIG. 1) and following the space 73 is formed a space 75 open to the cope 67.

The cope 67 has a section 77 which fits with the space 75, and on the side of the drag 63 is formed a face 79 in the shape corresponding to the cone distance large end face B.

In such a closed forging metal mold, the internal pressure working area of the die 63 can be positioned deep from the open end by a distance required. Therefore, the metal mold to be obtained has high rigidity and strength.

As many apparently widely different embodiments of this invention may be made without departing from the spirit and scope thereof, it is to be understood that the invention is not limited to the specific embodiments thereof except as defined in the appended claims.

What is claimed is:

1. A metal mold for plastic working a differential pinion having a plurality of teeth, wherein each tooth comprises an uncut, unground end relief face intersecting with a cone distance large end face and a tooth face, the tooth face and the end relief face each having continuous fiber flow, the fibers being longitudinally aligned in such manner that they are parallel to the tooth face and the end relief face substantially at all points therealong, to thereby improve tooth contact and reduce noise and pitting of the teeth without requiring grinding or cutting the pinion after forming thereof, the metal mold has a punch fitted with a die and the punch has its portion facing the die formed with a shape corresponding to said cone distance large end face and the die has a first space and a second space, wherein the first space is on the side of a cone vertex with a face as a boundary for producing a certain tooth shape and the second space is bounded by a die surface parallel to an axis of rotation of the differential pinion, said die surface forming said end relief face, and said second space continues to an open end of the die facing the punch, wherein the punch is fitted in said second space and guided by said die surface.

2. A method for plastic working with the plastic working metal mold for the differential pinion of claim 1, comprising the step of: inserting the portion of the punch facing the die to a desired cone distance large end face position in the die to produce the tooth face, the end relief face and the cone distance large end face simultaneously.

* * * * *